United States Patent
Engfer et al.

(10) Patent No.: US 6,321,289 B1
(45) Date of Patent: Nov. 20, 2001

(54) APPARATUS FOR AUTOMATICALLY NOTIFYING OPERATING SYSTEM LEVEL APPLICATIONS OF THE OCCURRENCE OF SYSTEM MANAGEMENT EVENTS

(75) Inventors: Robert P. Engfer, Minnetonka; Robert R. Hoffman, Jr., Mounds View, both of MN (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/289,152

(22) Filed: Apr. 8, 1999

(51) Int. Cl.$^7$ .................................................. G06F 13/24
(52) U.S. Cl. ........................................ 710/260; 710/48
(58) Field of Search .................................. 710/260–269, 710/46–50

(56) References Cited

U.S. PATENT DOCUMENTS

| | | | |
|---|---|---|---|
| 5,357,628 | * 10/1994 | Yuen | .................................. 714/34 |
| 5,708,819 | * 1/1998 | Dunnihoo | .............................. 713/323 |
| 5,974,573 | * 10/1999 | Martin | ..................................... 714/48 |
| 6,070,253 | * 5/2000 | Tavallaei et al. | ...................... 714/31 |

* cited by examiner

Primary Examiner—Sumati Lefkowitz
(74) Attorney, Agent, or Firm—Trop, Pruner & Hu, P.C.

(57) ABSTRACT

Techniques to notify an operating system level application that a system management event has occurred include setting a value (while executing in the system management mode) that is visible to the operating system (and applications executing thereunder) before returning control to the operating system. The operating system visible value may cause a special system management driver routine to execute. The special system management driver routine may determine various characteristics of the system management event and pass this information to an application.

18 Claims, 5 Drawing Sheets

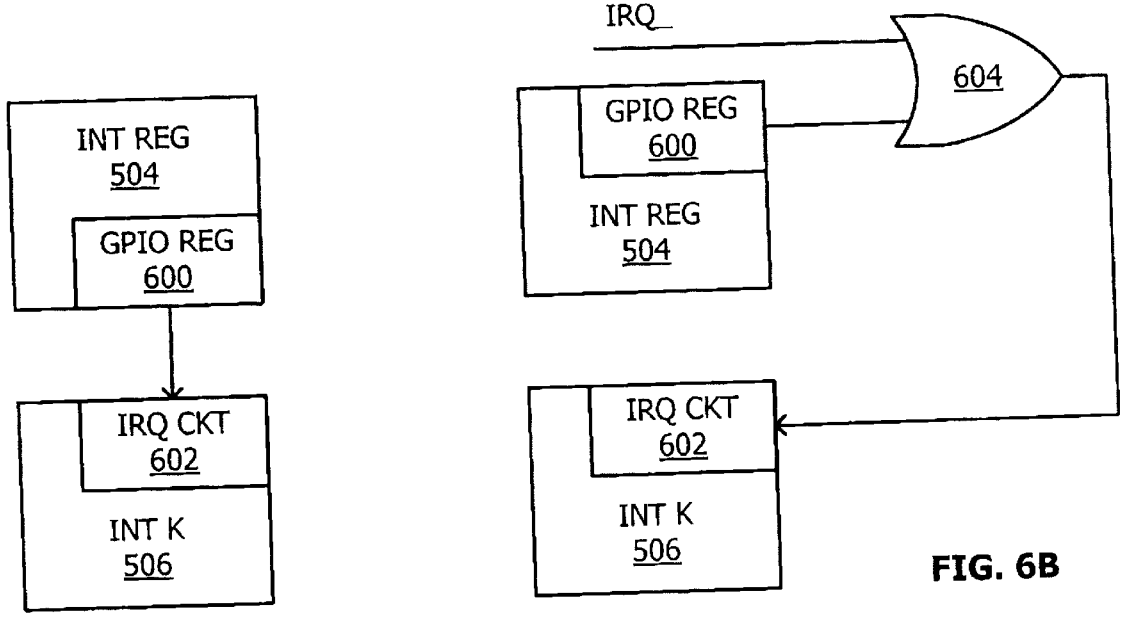
FIG. 6A
FIG. 6B
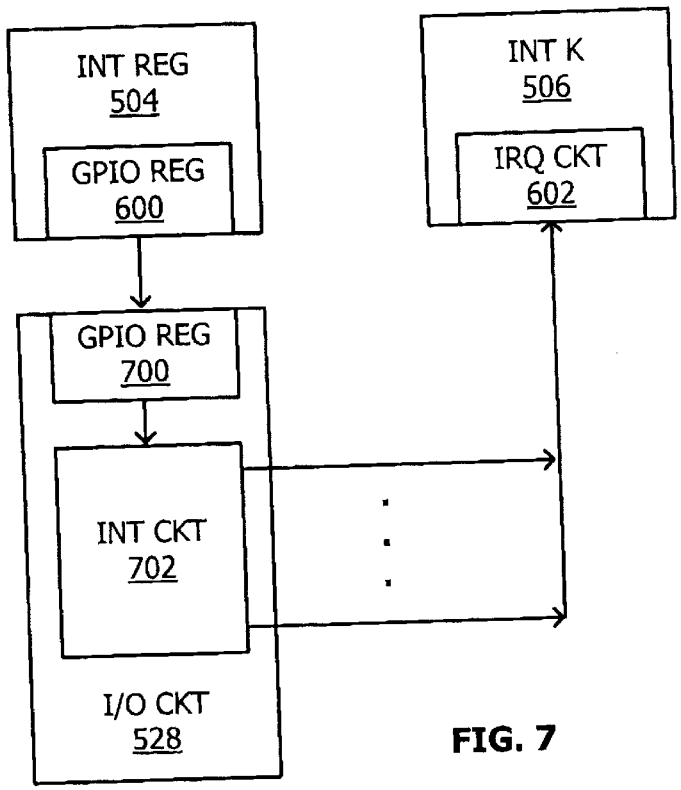
FIG. 7

APPARATUS FOR AUTOMATICALLY NOTIFYING OPERATING SYSTEM LEVEL APPLICATIONS OF THE OCCURRENCE OF SYSTEM MANAGEMENT EVENTS

RELATED APPLICATIONS

This application is related to U.S. patent application entitled Interrupt Notification Method", application Ser. No. 09/289,151, filed contemporaneously.

BACKGROUND

The invention relates generally to computer system management and, more particularly, to the exchange of information between an operating system and an interrupt processing routine.

In many computer systems, management activities such as those associated with temperature, voltage, and front panel button monitoring are performed by routines that operate transparently to the operating system. Referring to FIG. 1, for example, when a system management event occurs a system management interrupt (SMI) is generated that causes the operating system to transfer control to a SMI handler (block 100). Once invoked, the SMI handler determines what event occurred and takes the appropriate action (block 102). As part of the handler's operation, it may modify one or more hardware registers and/or system memory locations to indicate the occurrence of the event. Finally, the SMI handler transfers control back to the operating system which restarts (i.e., begins executing) that program/application that was executing at the time the SMI occurred (block 104).

During execution of a SMI handler, neither the operating system or any application executing under it has any knowledge of what system management event occurred or what actions the responding handler has taken. Thus, to obtain information about the occurrence of system management events applications such as LANDesk® (from Intel Corporation of California) and Unicenter TNG® (from Computer Associates International of New York) may poll the operating system as shown in FIG. 2. On expiration of an application specific timer (block 200) the system management application initiates a query that, eventually, examines the hardware registers and/or system memory locations that the SMI handler modified (block 202). If the SMI handler modifications indicate a change relevant to the initiating application (the 'yes' prong of diamond 204), this information is returned to the querying application (block 206) and processing continues (block 208). If the SMI handler modifications do not indicate a change relevant to the initiating application (the 'no' prong of diamond 204), normal processing continues (block 208).

Disadvantages of polling techniques include wasted processor time and a lack of event to application-action synchronization. Processor time is wasted every time a polling operation (i.e., acts in accordance with FIG. 2) is performed when a system management event has not occurred. Synchronization between the occurrence of a system management event and an application taking action in response to that event is lost because of the granularity of the associated event timer. In prior art systems, optimization of one of these problems tends to exacerbate the other. For example, to improve synchronization an application's timer must be very short. This, however, generates more application queries or polling cycles which, in turn, use more processor time. Alternatively, to reduce processor use, an application's timer may be set to a larger value. A larger timer value, however, adds to the aforementioned synchronization problem. Thus, it would be beneficial to provide techniques to improve system management event processing.

SUMMARY

The invention provides a mechanism by which an operating system level application/program is notified of a system management event. The invention conserves computer system processor time by avoiding the use of polling techniques and provides synchronization between the occurrence of a system management event and the detection of that event by the operating system level application.

In one embodiment, the invention provides a program storage device having instructions to set a value while executing in the system management mode that is visible to the operating system (and applications executing thereunder) before returning control to the operating system. In one embodiment, the operating system visible value may cause cause a special system management driver routine to execute. The special system management driver routine may determine various characteristics of the system management event and pass this information to the operating system and/or application.

In another embodiment, the invention provides a computer system that includes an interrupt register, an interrupt controller, a central processing unit adapted to execute an operating system in a first mode and a system management interrupt routine in a second mode, and a system management interrupt routine adapted to set a value in the interrupt register, the value causing the interrupt controller to indicate to the central processing unit when executing in the first mode that a system management event occurred.

BRIEF DESCRIPTION OF THE DRAWINGS

FIGS. 6A and 6B show two embodiments of how a system management interrupt routine may notify an application of a system management event in accordance with the method of FIG. 4 and computer system of FIG. 5.

FIG. 7 shows another embodiment of how a system management interrupt routine may notify an application of a system management event in accordance with the method of FIG. 4 and computer system of FIG. 5.

DETAILED DESCRIPTION

Techniques (including methods and devices) to provide substantially synchronous notification of a system management event to an operating system level program or application are described. The following embodiments of the invention are illustrative only and are not to be considered limiting in any respect.

In one embodiment of the invention, an operating system's system management interrupt (SMI) handler may be modified so that on SMI handler return, a special device driver routine is executed rather than immediately returning control to the previously suspended application (i.e., that program that was running at the time the SMI occurred). The special device driver may determine what system management event occurred, provide this information to one or more operating system (OS) level applications (e.g., system management applications such as LANDesk® and Unicenter TNG®), and then cause the OS to resume executing the originally suspended application. In this way, the OS and system management applications may receive system management event notification substantially synchronous to the system management event without incurring the processing overhead associated with polling.

Figure 1:
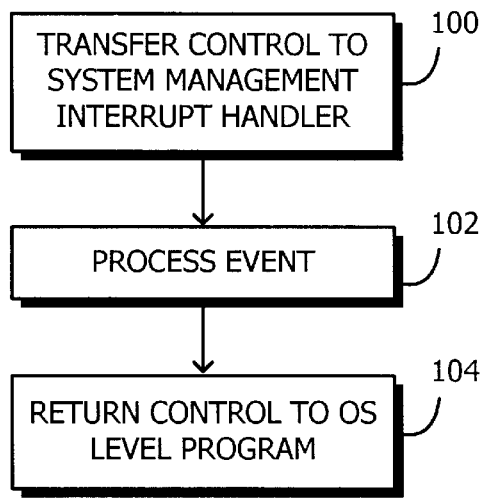
FIG. 1 shows a prior art system management event processing routine.
Figure 2:
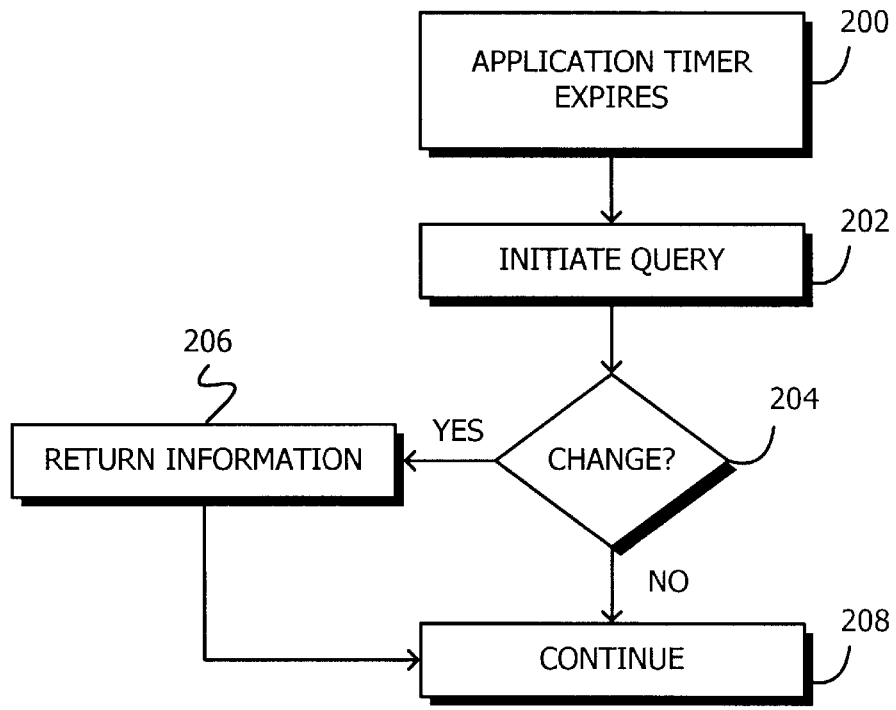
FIG. 2 shows a polling operation used in conjunction with the event processing routine of FIG. 1.
Figure 3:
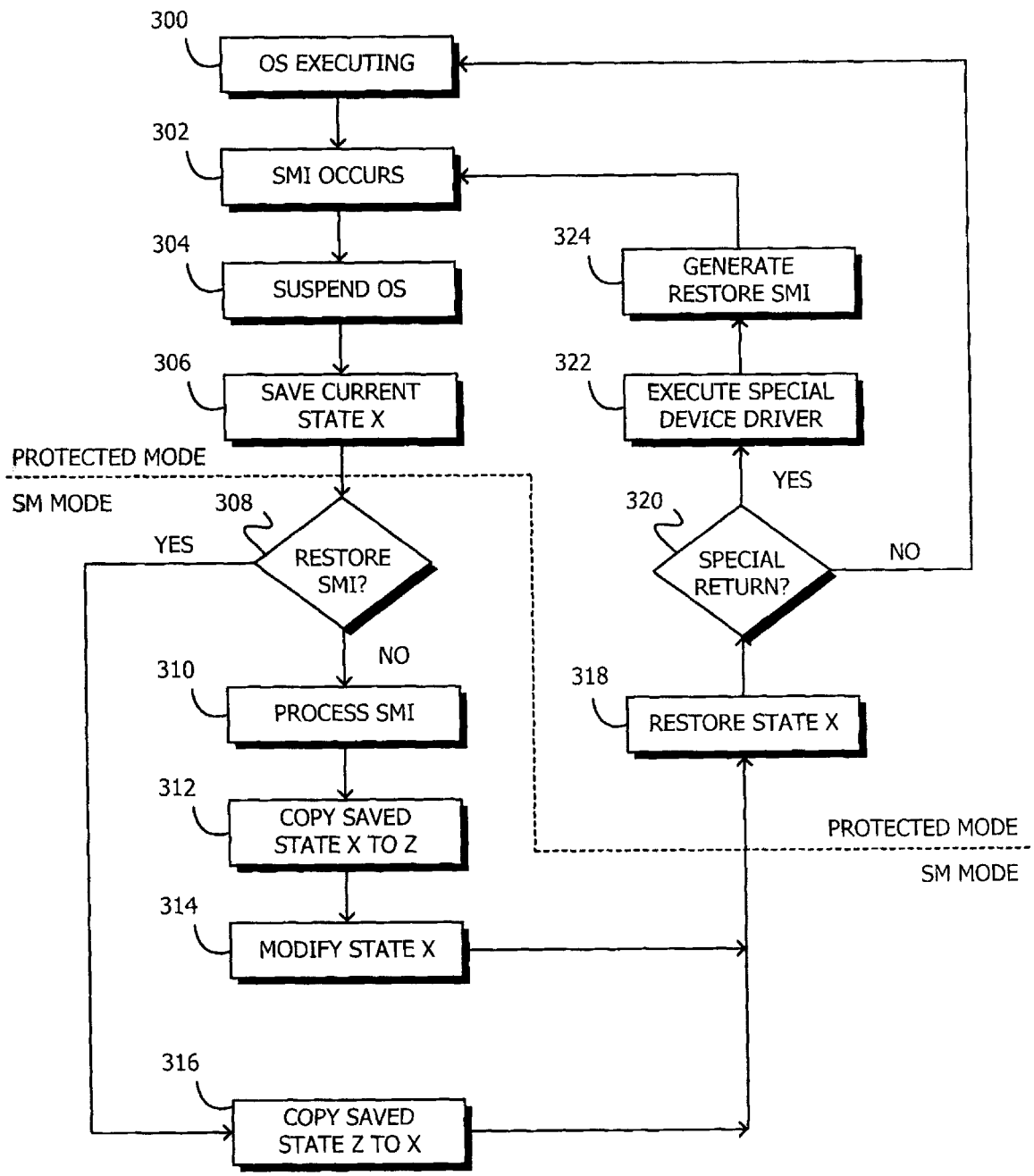
FIG. 3 shows a system management interrupt (SMI) handler method in accordance with one embodiment of the invention.

Referring to FIG. 3, a SMI handler method in accordance with one embodiment of the invention is shown. During normal operations an OS executes in protected mode to control the overall function of a computer system (block 300). When a system management interrupt occurs (block 302) the OS is suspended (block 304) and the current state of the central processing unit or processor is saved in system memory—call this saved state X (block 306). State X, for example, may include all that information needed to restore operation of the application/program that was executing before the SMI of block 302 occurred.

Following the acts of block 306, the computer system is transitioned from the protected mode to the system management mode where operations are controlled by SMI routines that are generally part of the computer system's basic input-output system (BIOS). BIOS routines are typically stored in a nonvolatile memory coupled to the computer system's processor through one or more bridge circuits. (See discussion below regarding FIG. 5.) If the SMI does not correspond to a RESTORE interrupt as discussed below (the 'no' prong of diamond 308), the SMI handler performs those tasks necessary to process the event (block 310) and typically includes making an entry in a system event log—a list of detected system management events that may be stored in a non-volatile memory. Illustrative system management events include, but are not limited to, the detection of computer system voltages and/or temperatures falling outside a specified range, activation of one or more front panel buttons, opening of the computer system chassis, and the insertion of a new device card. Following the system management event processing acts of block 310, previously saved state X information is copied to a predetermined location—call this copy of state X, state Z (block 312). State X may now be modified (block 314) so that on SMI handler return a special device driver routine designed to notify applications of system management events may be executed.

Next, state X is restored (block 318) transitioning the computer system back to protected mode operation. If the restored state corresponds to that state modified by the acts of block 314 (the 'yes' prong of diamond 320), the special device driver is executed (block 322). The special device driver may check the system event log or one or more predetermined hardware registers and/or system memory locations to determine what system management event generated the SMI. Information representing various aspects of the system management event (e.g., what event, what actions were taken by the SMI handler in response to the event, and the time of the event) may then be passed, by the special device driver, to one or more applications/programs. For example, conventional message passing techniques may be used to pass this information between the special device driver and the one or more applications. On completion, the special device driver may generate a SMI that indicates a RESTORE system management interrupt event. This special SMI may be identified during the acts of diamond 308.

If the SMI of block 302 corresponds to the RESTORE SMI of block 324 this is detected at diamond 308 (the 'yes' prong), state Z is copied into the location reserved for state X (block 316). State X is restored (block 318) causing the originally suspended application to resume (following the 'no' prong of diamond 320 to block 300).

It will be recognized that system state (e.g., state X and Z in FIG. 3) may be stored in computer system random access memory. Typically, such information is stored at a location that is usable by the computer system's processor only when in system management mode. In a Microsoft Windows® operating system for example, this may be a 128 Kilobyte block above the 640 Kilobyte range.

Figure 4:
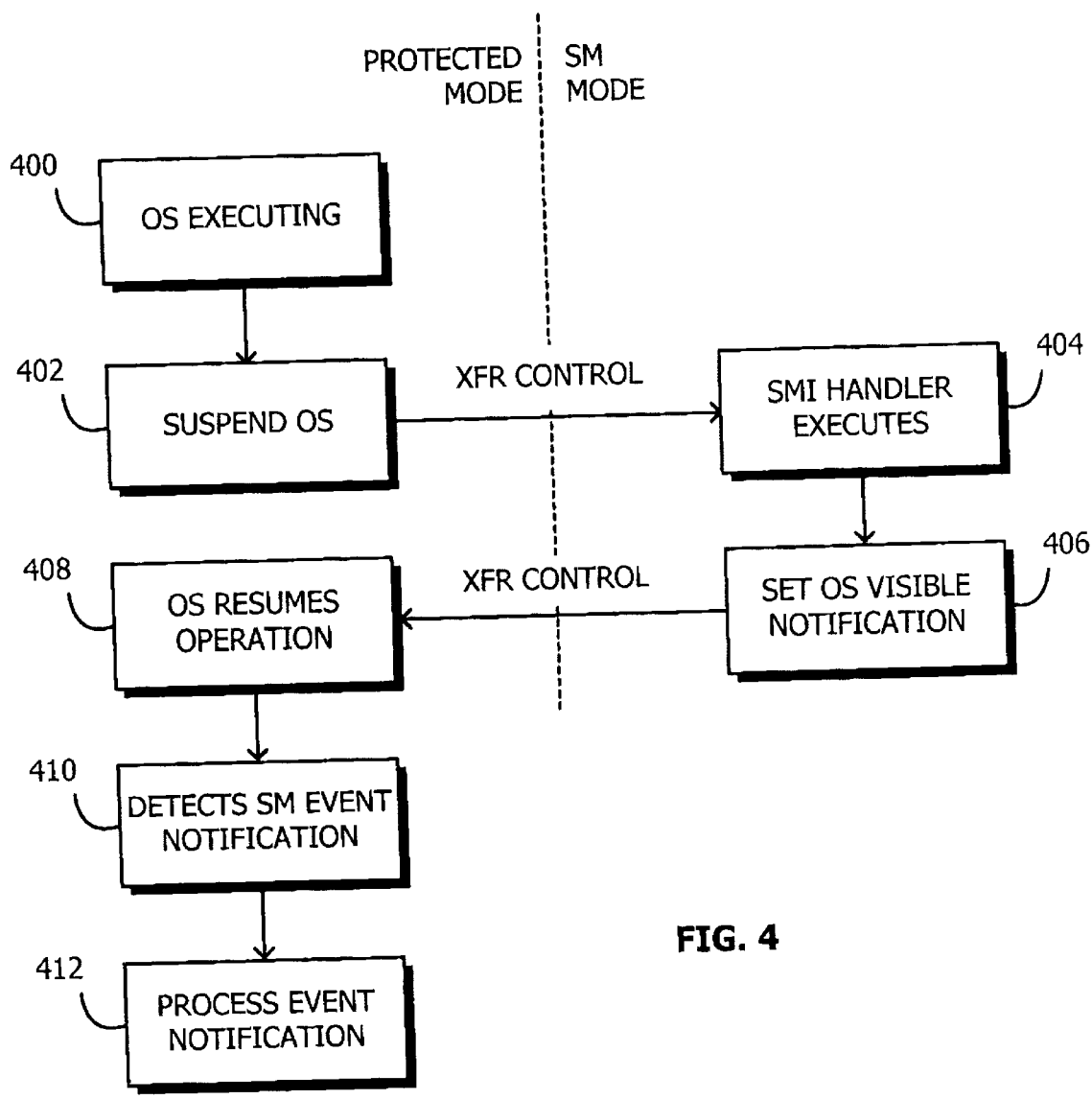
FIG. 4 shows another method in accordance with the invention in which an interrupt service routine is used to detect and report the occurrence of a system management event.

In another embodiment of the invention, an SMI handler may be modified to use interrupt service routines to detect and report the occurrence of system management events. Referring to FIG. 4, for example, a method in accordance with this embodiment executes in the protected mode (block 400) until a system management event occurs (block 402). The system management event causes an SMI that results in the transfer of control from the OS to the SMI handler (executing in the system management mode). Following conventional system management event processing (block 404), the SMI handler may set an operating system visible event flag (block 406) before returning control to the operating system (block 408). In one embodiment, the operating system visible event flag may be associated with one or more system management hardware registers that are adapted to generate an IRQ (interrupt request). Upon return (block 408), the operating system detects the previously set notification (block 410) and takes the appropriate action (block 412). For example, if the operating system visible event flag generates an IRQ, the operating system may invoke a interrupt service routine (block 412). The interrupt service routine may clear the IRQ, check the system event log and one or more predetermined hardware registers and/or system memory locations to determine what system management event generated the SMI. Information representing various aspects of the system management event (e.g., what event, what actions were taken by the SMI handler in response to the event, and the time of the event) may then be passed (via conventional message passing techniques, for example), by the interrupt service routine, to one or more system management applications such as LANDesk® and Unicenter TNG®. The interrupt service routine that processes event notification in accordance with the acts of block 412 performs substantially the same functions as the special device driver of FIG. 3.

Figure 5:
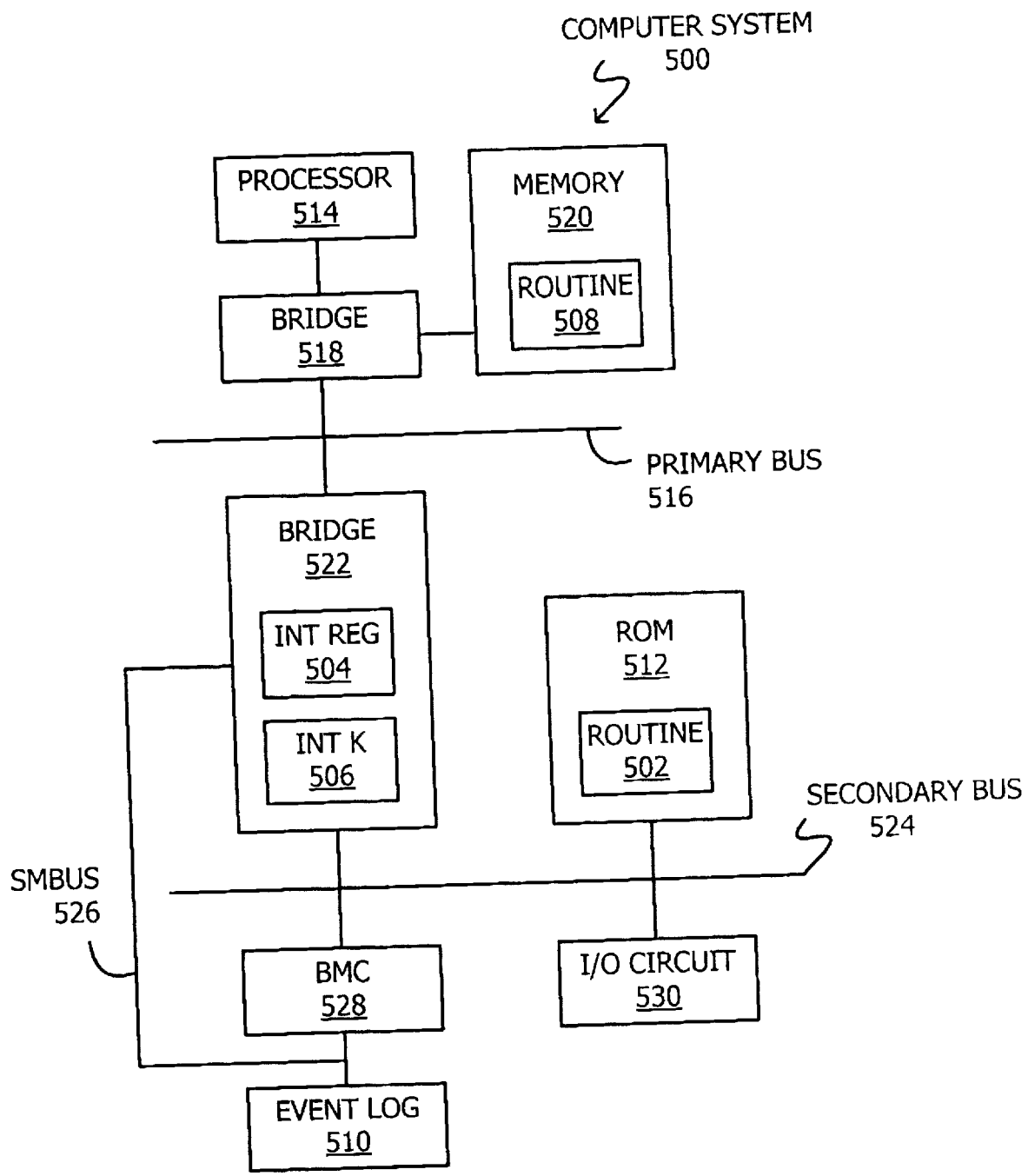
FIG. 5 shows a computer system providing system management event notification in accordance with the method of FIG. 4.

Referring to FIG. 5, a computer system 500 providing system management event notification in accordance with the method of FIG. 3 is shown. On completion of its system management event processing tasks, but prior to returning control to the operating system, SMI handler routine 502 sets a value in one or more interrupt registers 504. When the operating system regains control, it is notified of the system management event via the combination of the interrupt register value established by routine 502 and interrupt controller 506. The operating system may then invoke a conventional interrupt service routine 508 to determine what event occurred. For example, an interrupt service routine may inspect one or more values in interrupt registers 504 and/or inspect event log 510. (System management interrupt routine 502 may be associated with, or incorporated within, computer system 500's BIOS and stored in system read only memory (ROM) 510.)

As shown in FIG. 5, computer system 500 may also include host processor 514 coupled to primary bus 516 through bridge circuit 518. Bridge circuit 518, in turn, may provide access to system memory 520 and, possibly, accelerated graphics port devices (not shown). Illustrative host processors include the PENTIUM® family of processors from Intel Corporation. Illustrative primary buses include those that operate in conformance with the Peripheral Component Interface (PCI) specification. An illustrative primary bus bridge circuit 518 is the 82543LX PCI-to-AGP controller manufactured by Intel Corporation. Illustrative system memory includes dynamic random access memory.

Bridge circuit 522 couples primary bus 516 to secondary bus 524, and typically incorporates interrupt registers 504 and interrupt controller 506. Bridge circuit 522 may also provide an interface to system management bus (SMBus) 526 and, perhaps, integrated device electronics and universal serial bus interfaces (not shown). Also coupled to secondary bus 524 is baseboard management controller 528 (to off-load battery and power management tasks from processor 514) and input-output (I/O) circuit 530 (to provide control of additional I/O devices such as parallel and serial ports, floppy disks, and infrared ports—not shown). As indicated, SMBus 526 couples event log 510 and baseboard management controller 528 to bridge circuit 522. SMBus 526 may also interconnect voltage and temperature sensors to BMC 528 (not shown) and system memory 520 to bridge circuit 522 (not shown). An illustrative secondary bus bridge circuit 522 is the 82371AB PCI-to-ISA/IDE controller made by Intel Corporation, and an illustrative secondary bus 524 operates in conformance with the Industry Standard Architecture (ISA) specification. An illustrative baseboard management controller 528 is the DS80CH10 from Dallas Semiconductor of Texas, and an illustrative I/O circuit 530 is the FDC37C93x device from Standard Microsystems Corporation of New York.

Referring to FIGS. 6A and 6B, system management interrupt routine 502 may set a predetermined bit (e.g., bit zero) in general purpose input-output (GPIO) register 600 in interrupt registers 504 to signal a system of a system management application of a system management event. Output from GPIO register 600 may be coupled to IRQ circuit 602 of interrupt controller 506. In one embodiment, the predetermined bit of GPIO register 600 may be coupled directly to IRQ circuit 602 of interrupt controller 506 as shown in FIG. 5A. In this embodiment, it is assumed that IRQ circuit 602 dedicates an IRQ to the predetermined GPIO register bit. In another embodiment, system management interrupt routine 502 shares an IRQ line with one or more existing devices/processes. In this embodiment, the predetermined bit of GPIO register 600 may be coupled to OR gate 604 which is then coupled to IRQ circuit 602 of interrupt controller 506 as shown in FIG. 6B.

Referring to FIG. 7, yet another embodiment of the invention involves use of the "interrupt steering" feature available through special GPIO registers in many input-output control circuits such as I/O circuit 530. As indicated, the predetermined bit of GPIO register 600 in interrupt register 504 may be coupled to GPIO register 700 in I/O circuit 530. In accordance with conventional interrupt steering mechanisms, interrupt circuit 702 in I/O circuit 530 may be configured (e.g., during computer system start-up or power on self test operations) to "steer" or route the indication received from GPIO register 700 to substantially any hardware IRQ of interrupt controller 506.

One benefit of a method in accordance with the invention is that the operating system (or an application executing under the operating system) does not have to poll to determine if a system management event occurred and, if so, what type of event it was. Thus, computer system processor time is conserved. Another benefit of a method in accordance with the invention is that there is synchronization between the occurrence of a system management event and the detection of that event by the operating system. Because of the special device driver in accordance with FIG. 3 or the operating system visible notification set by the system management interrupt routine of FIG. 4 is detected substantially immediately after the operating system resumes control from the SMI handler, the problem of synchronization caused by timer granularity may be avoided (see background discussion). It will be recognized that the time delay between the operating system regaining control (e.g., at block 318 of FIG. 3 or block 408 of FIG. 4) and detection of the system management event notification (e.g., at block 322 of FIG. 3 or block 410 of FIG. 4) may be variable.

Various changes in the materials, components, circuit elements, as well as in the details of the illustrated operational methods are possible without departing from the scope of the claims. For instance, interrupt registers 504 and/or interrupt controller 506 may be incorporated outside bridge circuit 522. In addition, the precise interrupt register location to modify to indicate occurrence of a system management event is not limited to bit zero of the GPIO register. The precise location that each system management interrupt routine modifies is a decision left to the designer. Further, acts in accordance with FIGS. 3 and 4 may be performed by a programmable control device executing instructions stored in any suitable storage device such as, for example, EPROM, EEPROM, and flash semiconductor memory devices. Illustrative programmable control devices include one or more computer processors, microcontrollers, and custom designed state machines.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A program storage device, readable by a programmable control device, comprising:
   instructions stored on the program storage device for causing the programmable control device to
   receive a system management interrupt indication;
   suspend operation of an application adapted to execute under an operating system;
   execute a system management interrupt handler;
   set an operating system visible indication of the received system management interrupt;
   resume operation of the operating system; and
   execute a routine based on the operating system visible indication, the routine adapted to inform the application of the system management event occurrence.

2. The program storage device of claim 1, further comprising instructions to resume operation of the application.

3. The program storage device of claim 2, wherein the instructions to resume operation of the application comprise instructions to resume operation of a protected mode application.

4. The program storage device of claim 3, wherein the instructions to resume operation of the protected mode application comprise instructions to resume operation of a system management application.

5. The program storage device of claim 1, wherein the instructions to set an operating system visible indication comprise instructions to set a value associated with an interrupt service request indicator.

6. The program storage device of claim 5, wherein the instructions to execute an interrupt service routine comprise instructions to inspect the state of a hardware register.

7. The program storage device of claim 5, wherein the instructions to execute a routine based on the operating system visible indication comprise instructions to execute an interrupt service routine.

8. The program storage device of claim 7, wherein the instructions to execute an interrupt service routine comprise instructions to inspect a computer system event log.

9. The program storage device of claim 7, wherein the instructions to execute an interrupt service routine further comprise instructions to clear the operating system visible indication.

10. The program storage device of claim 1, wherein the instructions to suspend operation of the application and the operating system comprise instructions to save information representing a current state of the operating system and the application to a first location.

11. The program storage device of claim 10, wherein the instructions to execute a system management interrupt handler comprise instructions to:

copy the information representing the current state from the first location to a second location; and modify the information stored at the first location to indicate the routine should be executed substantially immediately upon resuming operation of the operating system.

12. The program storage device of claim 11, wherein the instructions to execute a routine based on the operating system visible indication comprise instructions to inspect a computer system event log.

13. The program storage device of claim 11, wherein the instructions to execute the routine further comprise instructions to generate a system management interrupt indication to indicate the routine has completed processing a prior system management interrupt indication.

14. The program storage device of claim 13, wherein the instructions to execute a system management interrupt handler comprise instructions to determine if the system management interrupt indication indicates the routine has completed processing a prior system management interrupt indication and, if so, to copy the information stored at the second location to the first location to cause the application to be executed substantially immediately upon resuming operation of the operating system.

15. A computer system, comprising:

an interrupt register;

an interrupt controller;

a central processing unit adapted to execute an operating system in a first mode and a system management interrupt routine in a second mode; and a system management interrupt routine adapted to set a value in the interrupt register, the value causing the interrupt controller to indicate to the central processing unit when executing in the first mode that a system management event occurred.

16. The computer system of claim 15, wherein the interrupt register is one component of a bridge circuit, the bridge circuit operatively coupled to the central processing unit.

17. The computer system of claim 15, wherein the system management interrupt routine is stored in a nonvolatile memory, the nonvolatile memory operatively coupled to the central processing unit.

18. The computer system of claim 15, wherein the nonvolatile memory further comprises basic input-output system routines.

* * * * *